United States Patent
Goff et al.

(10) Patent No.: US 10,822,763 B1
(45) Date of Patent: Nov. 3, 2020

(54) ANTI-CORROSION STRUCTURE ANCHOR

(71) Applicant: USA INTELLECTUAL PROPERTY HOLDING, INC., Sarasota, FL (US)

(72) Inventors: James Earl Goff, Bradenton, FL (US); Luke John Drazek, Englewood, FL (US); John Curtis Thompson, Jr., Apollo Beach, FL (US); Anthony Lane Eldridge, Englewood, FL (US)

(73) Assignee: USA INTELLECTUAL PROPERTY HOLDING, INC., Sarasota, FL (US)

( * ) Notice: Subject to any disclaimer, the term of this patent is extended or adjusted under 35 U.S.C. 154(b) by 92 days.

(21) Appl. No.: 16/053,364

(22) Filed: Aug. 2, 2018

Related U.S. Application Data

(62) Division of application No. 15/447,790, filed on Mar. 2, 2017, now Pat. No. 10,280,580.

(60) Provisional application No. 62/303,809, filed on Mar. 4, 2016.

(51) Int. Cl.
| | |
|---|---|
| *C23C 2/26* | (2006.01) |
| *E02D 5/80* | (2006.01) |
| *E04H 12/20* | (2006.01) |
| *B24C 1/08* | (2006.01) |
| *C23C 28/00* | (2006.01) |
| *C23C 2/38* | (2006.01) |
| *C23C 2/06* | (2006.01) |
| *C23C 2/02* | (2006.01) |

(52) U.S. Cl.
CPC .................. *E02D 5/80* (2013.01); *B24C 1/08* (2013.01); *C23C 2/02* (2013.01); *C23C 2/06* (2013.01); *C23C 2/26* (2013.01); *C23C 2/38* (2013.01); *C23C 28/00* (2013.01); *E04H 12/20* (2013.01)

(58) Field of Classification Search
CPC .................................. C23C 2/00; C23C 2/26
See application file for complete search history.

(56) References Cited

U.S. PATENT DOCUMENTS

| | | | | |
|---|---|---|---|---|
| 3,675,381 A * | 7/1972 | Watson | ...................... | E02D 5/80 52/166 |
| 4,124,983 A * | 11/1978 | Weatherby | ................ | E02D 5/76 405/259.5 |
| 4,285,993 A * | 8/1981 | Green, Sr. | ............... | E02D 5/803 405/259.5 |
| 4,806,388 A * | 2/1989 | Mochizuki | ............... | B05D 1/24 118/429 |
| 8,375,651 B2 * | 2/2013 | Reyes | ...................... | E04H 12/20 52/151 |
| 2008/0193224 A1 * | 8/2008 | Davies | ...................... | E02D 5/80 402/259.1 |

FOREIGN PATENT DOCUMENTS

GB    1009055 A *  11/1965   ............. B05D 7/146

OTHER PUBLICATIONS

Derwent_2015-423813_CN104593639A (Year: 2015).*

* cited by examiner

*Primary Examiner* — Hai Y Zhang
(74) *Attorney, Agent, or Firm* — Smith & Hopen, P.A.; Paul Murty

(57) ABSTRACT

A process for manufacturing corrosion resistant metal components is disclosed. The process comprises abrasive blasting of a silicon-containing steel substrate followed by hot dip galvanizing, a second abrasive blasting process, treating with a mineral acid, and coating with a polymeric coating. The resulting corrosion resistance is enhanced.

7 Claims, 13 Drawing Sheets

ANTI-CORROSION STRUCTURE ANCHOR

CROSS-REFERENCE TO RELATED APPLICATIONS

The present application is a divisional of and claims priority to nonprovisional U.S. patent application Ser. No. 15/447,790, filed on Mar. 2, 2017, titled "Anti-Corrosion Structure Anchor," which claimed priority to provisional U.S. Patent Application Ser. No. 62/303,809, filed on Mar. 4, 2016, titled "Anti-Corrosion Structure Anchor," both of which are hereby incorporated by reference in their entireties.

BACKGROUND

1. Field of the Invention

This invention relates, generally, to structural supports. More specifically, it relates to corrosion resistant structural anchors and methods of manufacture.

2. Brief Description of the Prior Art

Radio towers, also referred to as masts, are tall generally slender structures for supporting telecommunications and broadcasting antennas. In addition, towers may be used for wind generators and electrical distribution. While some towers may be constructed to be self-supporting, other towers require a series of guy wires to hold them upright.

Guyed towers rely on guy wires to maintain the tower in a vertical position. Typically, these towers have a vertical mast section, typically triangular in shape that sits on top of a base foundation. Guy wires attach to the mast at specific locations and extend away from the main base and attach to a guy anchor point. Typically, there are at least 3 guy anchor points arrayed evenly around the base foundation in 120-degree increments. The number of guy wires, their attachment points on the mast, the number of guy anchor points, and their arrangement are each based on the loading requirements of the tower. Guy anchors are usually installed as a critical component of the structural support system and are regarded as a permanent ground anchor.

SUMMARY OF THE DISCLOSURE

The present disclosure is directed to methods for manufacturing a corrosion resistant metal component. In an exemplary method, a silicon-containing metal component may be provided. The metal component may be subjected to a surface cleaning process. The cleaned metal component may then be subjected to a galvanizing process, and the galvanized metal component may be subjected to an abrasive blasting process. The abrasively blasted galvanized metal component may be treated with a mineral acid.

According to additional exemplary embodiments, the present disclosure may be directed to methods for the prevention of forming a galvanic corrosion cell. In an exemplary method, a silicon-containing metal component anode may be provided. An essentially non-conductive coating may be applied on the metal component anode, comprising the steps of subjecting the metal component anode to an abrasive blasting process; subjecting the abrasively blasted metal component anode to a galvanizing process; subjecting the galvanized metal component anode to a surface roughening process; treating the surface roughened galvanized metal component anode with a mineral acid; and applying a polymeric coating to the treated metal component anode. Essentially no electrical current may flow between the metal component anode and a cathode when the metal component anode and the cathode are placed in a galvanic corrosion cell.

According to further exemplary embodiments, the present disclosure may be directed to a corrosion resistant metal component. The corrosion resistant metal component may comprise a silicon-containing metal component comprising an abrasively blasted outer surface, the metal component intended for installation in an electrically conductive medium. A multilayer coating system may be applied to the abrasively blasted outer surface of the metal component, the multilayer coating system comprising: a hot dip zinc alloy coating applied to the abrasively blasted outer surface, the zinc alloy coating subsequently abrasively blasted and then treated with a mineral acid; and a polymeric coating applied over the treated zinc alloy coating. The multilayer coating system may prevent conduction of an electrical current when the coated metal component is installed in the electrically conductive medium.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the present disclosure may be practiced. It is to be understood that other embodiments may be utilized, and structural changes may be made without departing from the scope of the present disclosure.

Many types of structures require external guy wires for structural support or to arrest movement. For example, tethered marine structures such as floating docks and piers may have guy wires connected to land in order to maintain the structure in a desired location. Land-based structures, such as towers and masts, may have sufficient compressive strength to support their own weight, but lack shear strength to remain upright when subjected to non-vertical loads such as wind shear. Guy wires may be used to provide lateral support.

Figure 1:
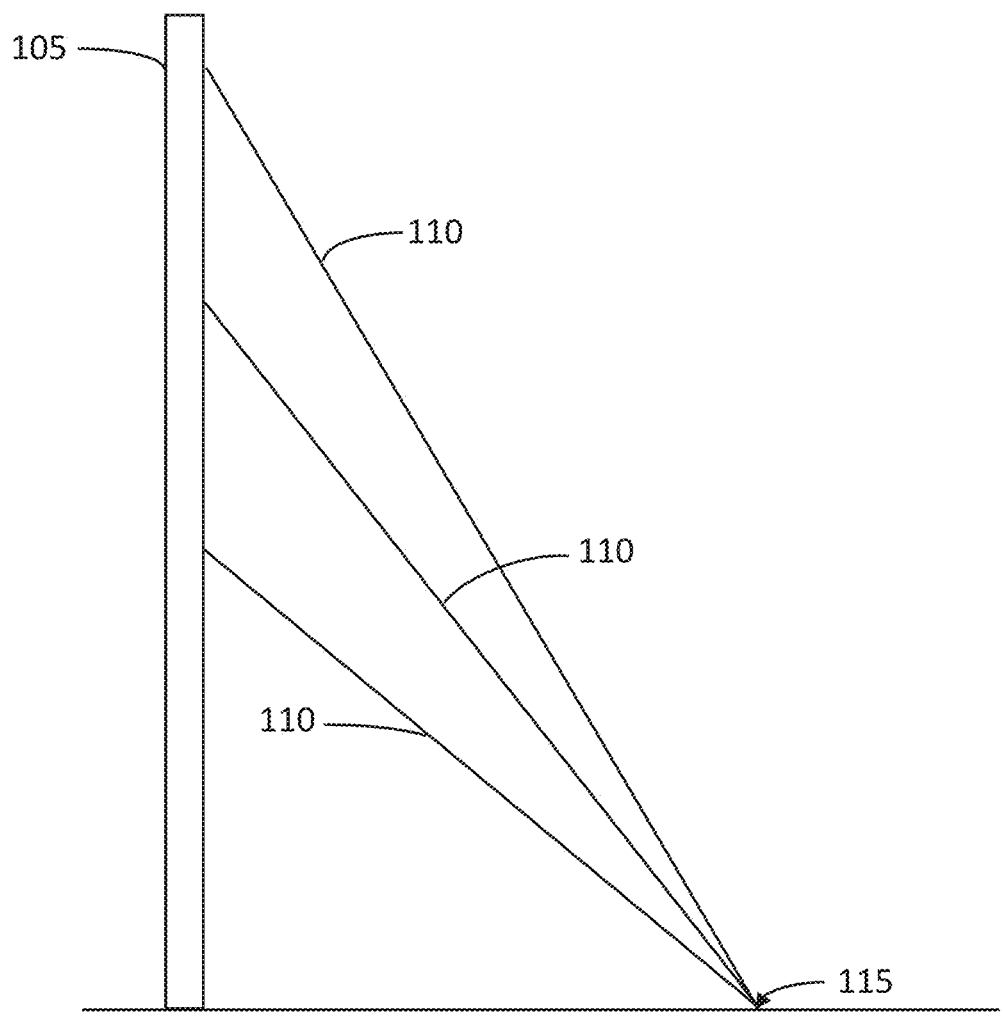
FIG. 1 is a side schematic view of a tower and guy wires.

Regardless of the intended use of the guy wire, an end of the guy wire opposite from the end coupled to the structure is typically mounted to an anchor point secured in the ground. FIG. 1 is a schematic illustration of a tower 105 having a plurality of guy wires 110 connected at one end to the tower and at the opposite end to one or more anchor points 115. In many applications, the anchor point 115 may comprise a steel rod partially embedded within a large block of concrete. One or more of the guy wires 110 may be coupled to the steel rod. The concrete block and at least a portion of the steel rod may be buried in the ground.

Figure 2:
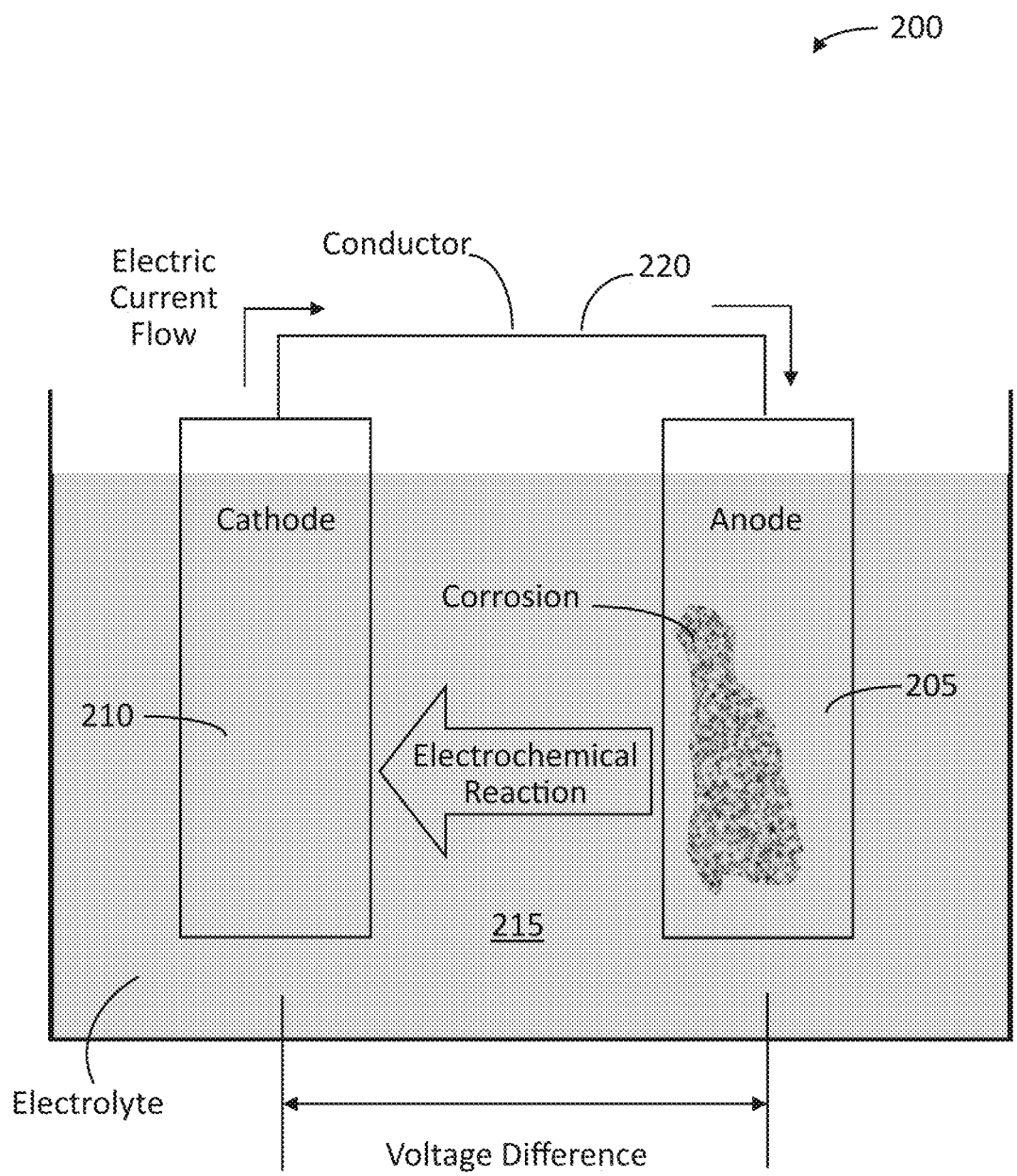
FIG. 2 is schematic diagram of a corrosion cell.

While burying the anchor point 115 in the ground may be necessary to immobilize the anchor point 115, doing so may lead to corrosion of the steel rod and eventual failure. Corrosion is an electrochemical process and may be galvanic or electrolytic. Galvanic corrosion may occur when a corrosion cell is inadvertently created. FIG. 2 schematically illustrates the components of a corrosion cell 200. The corrosion cell 200 requires an anode 205 and a cathode 210 coupled by an electrical conductor 220. To complete the corrosion cell 200, the anode 205 and the cathode 210 is typically in an electrically conductive electrolyte 215. A voltage difference between the anode 205 and the cathode 210 creates a potential for electrical flow between the two. Once the corrosion cell 200 is established, an electrochemical reaction may take place where the anode 205 gives up electrons into the electrolyte 215. This loss of electrons causes the anode 205 to corrode. If left unchecked, the corrosion may continue until the anode 205 is completely dissolved into the electrolyte 215.

Figure 3:
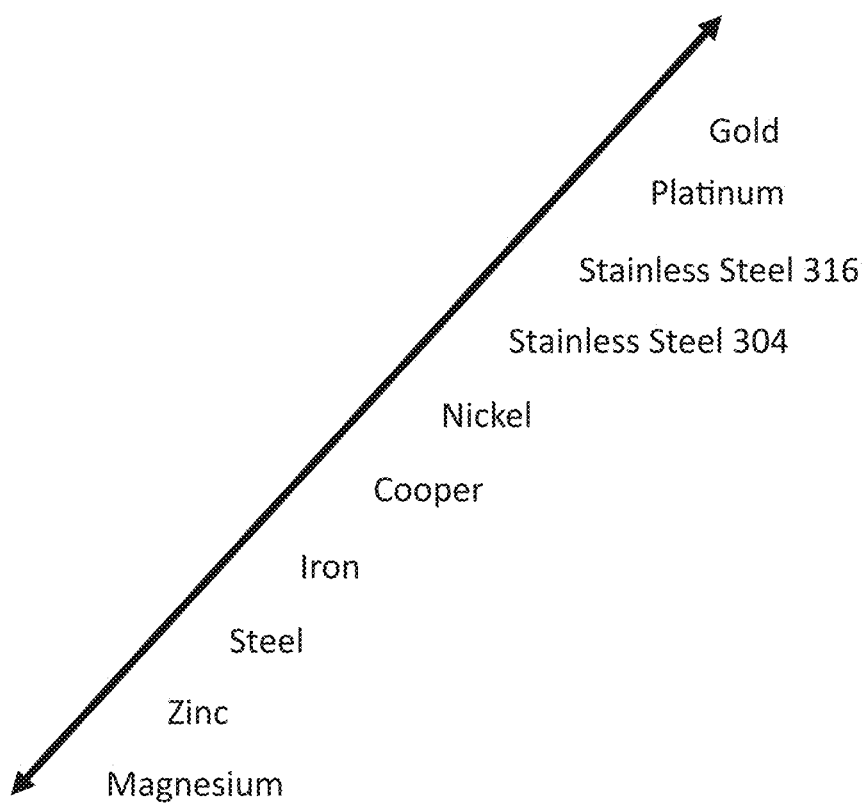
FIG. 3 is a chart of the galvanic series for selected metals.

Corrosion cells 200 are typically formed when the anode 205 and the cathode 210 are dissimilar metals. The difference in nobility (i.e., resistance to corrosion) between the anode 205 and the cathode 210 provides the voltage difference necessary to drive the galvanic cell 200. FIG. 3 presents the hierarchy of various metals in the galvanic series. The more noble metals, and thus more resistant to corrosion, are at the top of the chart, while the metals more susceptible to corrosion are near the bottom. If two dissimilar metals are connected in a galvanic cell 200, the less noble metal will become the anode 205 and will corrode.

Figure 4:
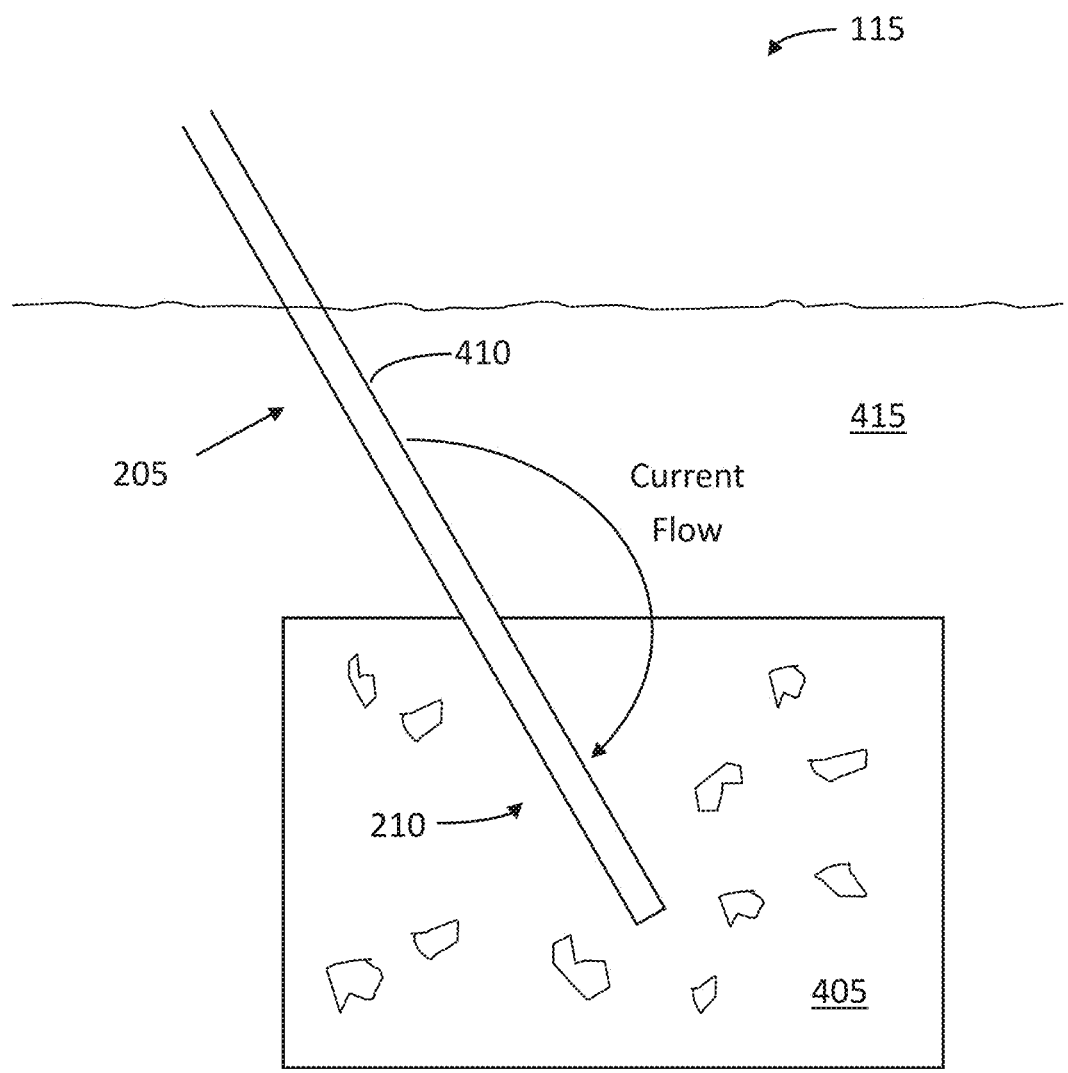
FIG. 4 schematic cross-sectional view of an anchor point.

FIG. 4 is a cross-sectional schematic illustration of an exemplary anchor point 115. As described above, the anchor point 115 may comprise a steel anchor rod 410 embedded in a block of concrete 405. The concrete block 405 may be buried in soil 415, and a portion of the anchor rod 410 may extend above ground. Because concrete is at least somewhat conductive, as is the soil 415 surrounding the concrete block 405, a galvanic cell 200 may be created where the portion of the anchor rod 410 outside the concrete block 405 acts as the anode 205 and the portion of the anchor rod 410 within the concrete block 405 acts as the cathode 210. Current may flow through the soil 415 and the concrete block 405 to complete the galvanic cell 200. This arrangement may cause the portion of the anchor rod 410 outside the concrete block 405 and within the soil 415 to corrode, typically near the interface of the anchor rod 410 and the concrete block 405. In addition, this current flow may penetrate the concrete block 405 and cause the portion of the anchor rod 410 within the concrete block to corrode.

Figure 5:
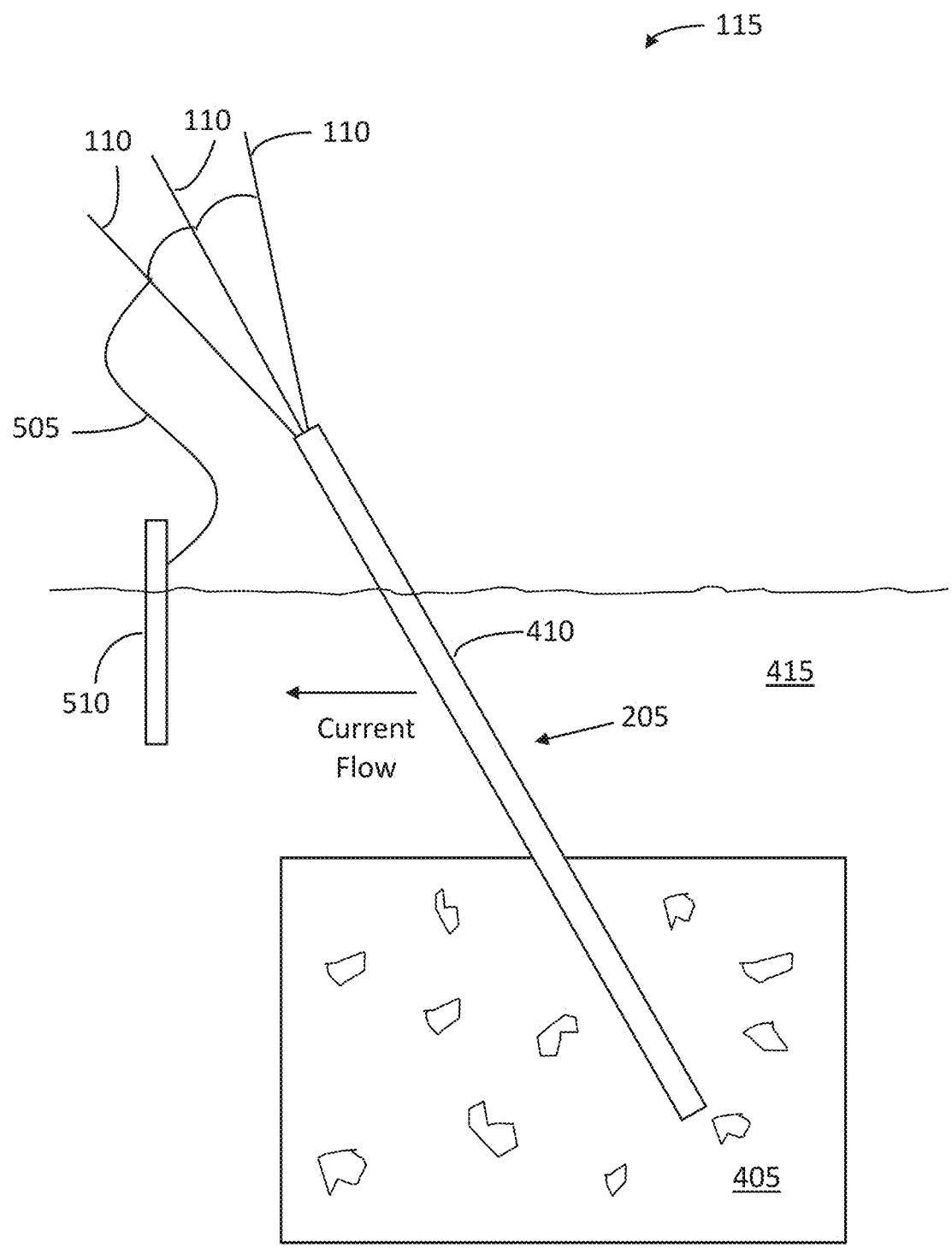
FIG. 5 is a schematic cross-sectional view of an anchor point.

FIG. 5 schematically illustrates the exemplary anchor point 215 of FIG. 4 with a grounding wire 505 coupled to the guy wires 110. The grounding wire 505 may be coupled to a copper grounding rod 510 inserted into the soil 415. In this example, there are two dissimilar metals (the steel anchor rod 410 and the copper grounding rod 510) immersed in an electrolyte (the soil 415) and electrically connected by the guy wires 110 and the grounding wire 505, creating a galvanic cell 200. Referring back to FIG. 3, copper is higher on the galvanic series chart than steel; therefore, the steel anchor rod will act as the anode 205 and will corrode, the corrosion again occurring on that portion of the anchor rod 410 outside the concrete block 405 and within the soil 415.

Figure 6:
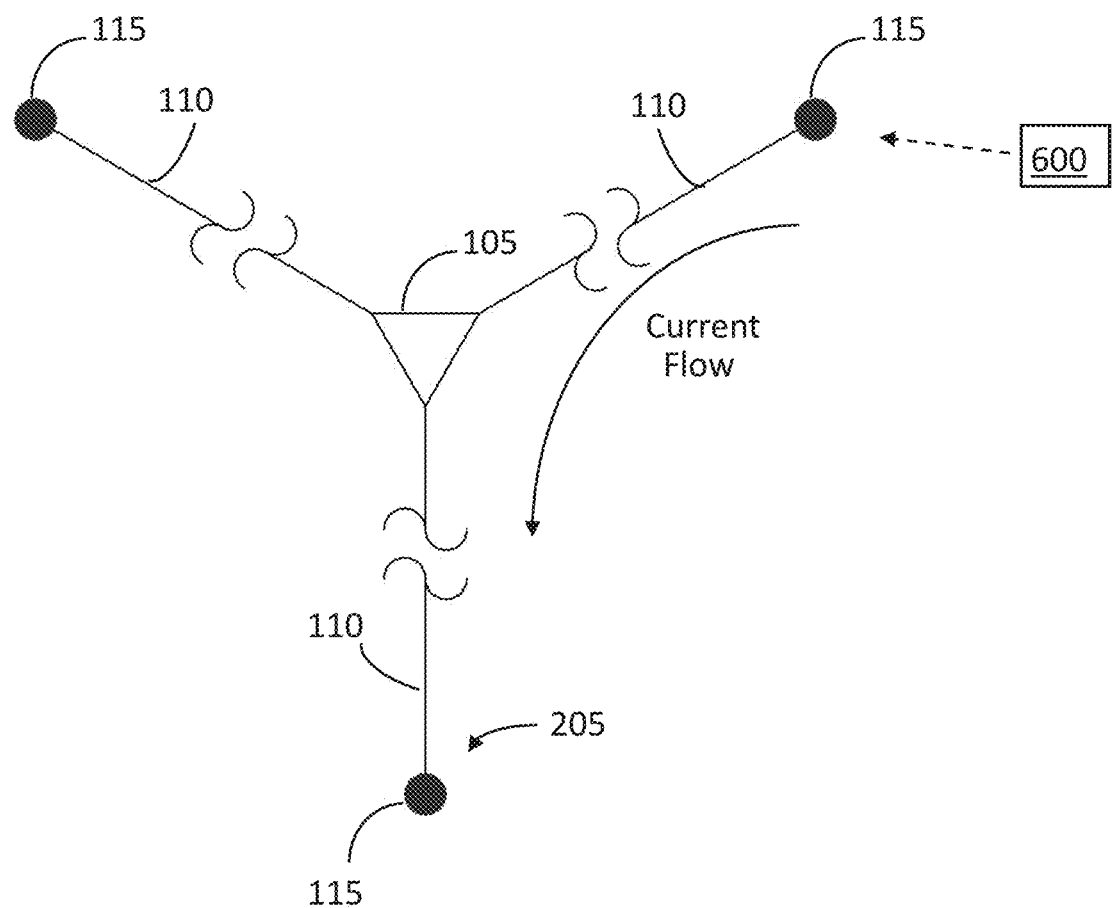
FIG. 6 is a schematic top view of a tower and guy wires.

Anchor rods 410 buried in the soil 415 may also be susceptible to corrosion induced by stray current in the soil 415 from an outside source. Such outside sources may comprise power generating equipment using an earth ground, welding equipment, and underground pipelines with an impressed current to reduce pipeline corrosion. As illustrated by exemplary embodiments in FIG. 6, which schematically illustrates a top view of the tower 105 and guy wires 110, the source 600 of stray current may be located in the vicinity of the tower 105. Stray current (indicated by the dashed arrow in FIG. 6) introduced into the soil 415 may be conducted by a first anchor rod 410, through guy wires 110 to the tower, through additional guy wires 110 to a second anchor rod 410 and back into the soil 415, this being the path of least resistance. Corrosion may occur on that portion of the second anchor rod 410 within the soil 415, which becomes the anode 205 in the corrosion cell 200.

Although a variety of methodologies have been used to prevent or reduce the rate of acceleration of corrosion of the anchor rod 410, they all suffer from significant drawbacks. For example, various coatings have been used on the anchor rods 410, but these coatings are typically prone to damage during shipping and handling, as well as the rough nature of installing the concrete block 405 and the anchor rod 410 below ground. In some cases, a damaged coating can accelerate corrosion to the point of failure faster than if there was no coating at all.

Figure 7:
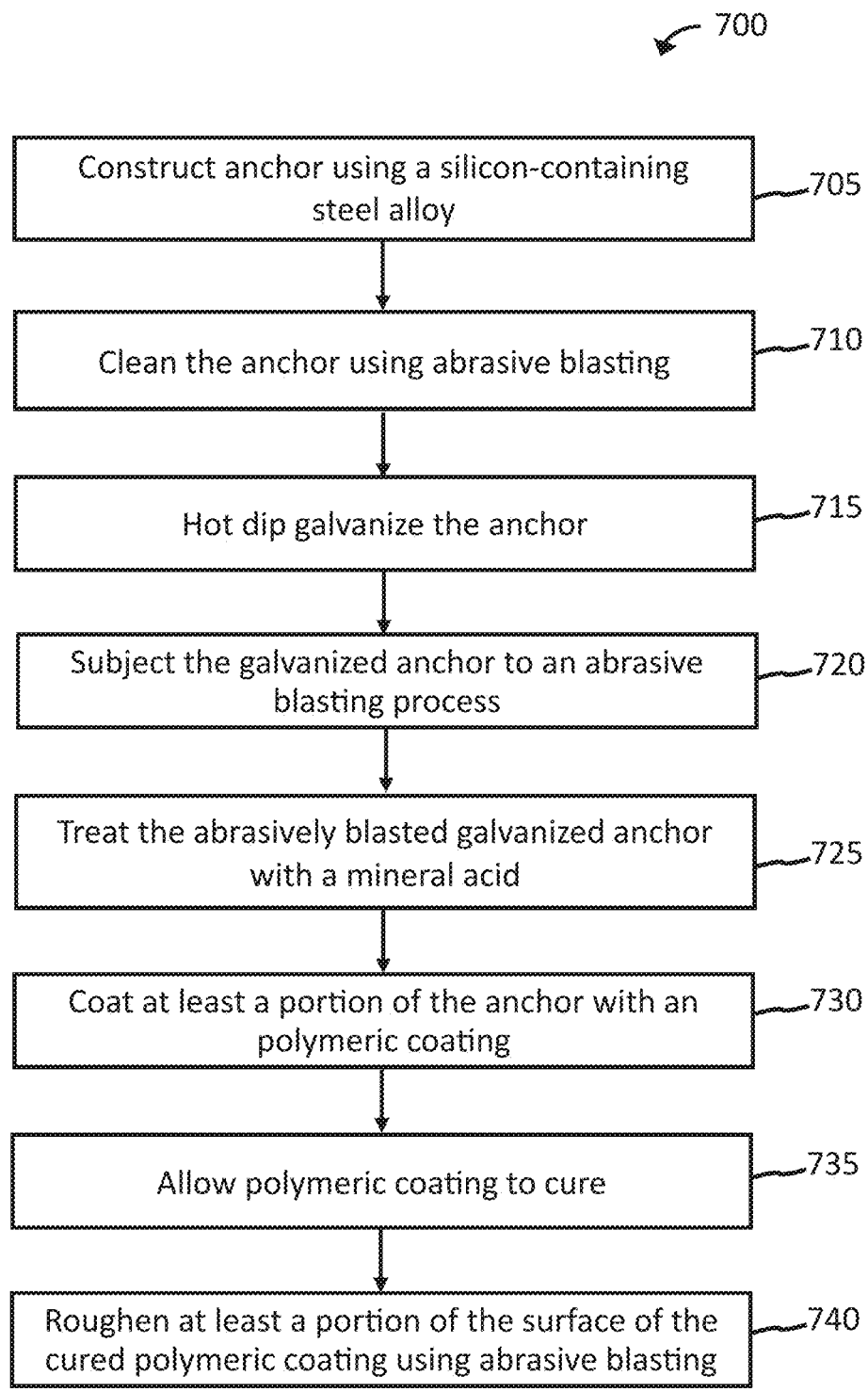
FIG. 7 is a flow diagram of an exemplary method for corrosion treatment.

FIG. 7 is a flow diagram of an exemplary method 700 for treating anchor rods 410 that may prevent corrosion of the anchor rod 410 or reduce the rate of corrosion. At step 705, a steel alloy containing silicon is selected for the manufacture of the anchor rod 410. For example, A572-50 grade steel may be selected for the anchor rod 410. The silicon content of the steel alloy in various embodiments may range from about 0.04 percent to about 0.4 percent depending, for example, on a shape of the anchor rod 410 and strength and other design requirements of a design of the anchor rod 410. One skilled in the art will readily recognize that various embodiments may comprise steels with other silicon content ranges than that specified above, depending on the grade of steel chosen for a particular application. After constructing the anchor rod 410, the anchor rod 410 may be cleaned and abraded at step 710 using abrasive blasting. Exemplary abrasive blasting media may comprise steel grit, steel shot, sand, garnet, kieserite, metal slag, coal slag, aluminum oxide, silicon carbide, glass, ceramic, and the like, as well as mixtures of these media. The abrasive blasting may be conducted dry or wet. The particle size (e.g., grit size) of the blasting media may be of any size suitable to achieve the desired surface finish considering such factors as nozzle pressure of the blast equipment, flow rate of the blast media, metal allow of the anchor rod 410, level of dirt and scale on the anchor rod 410, etc. In various embodiments, the resulting surface of the anchor rod 410 may meet the Society for Protective Coatings Surface Preparation Standard No. 10 (SSPC-SP No. 10)/National Association of Corrosion Engineers (NACE) No. 2 Near White Blast Cleaning, or may meet International Standards Organization (ISO) 8501 Sa2.5. Various embodiments may comprise cleaning and abrading methods other than abrasive blasting, such as chemical etching, or any suitable process known in the art.

After the abrasive cleaning step, the anchor rod 410 may be hot dip galvanized at step 715. The roughened surface of the anchor rod 410 created by the abrasive blasting step may increase the surface area of the anchor rod 410. The increased surface area may result in a thicker zinc alloy coating from the hot dip galvanizing process. In some embodiments, the zinc alloy coating may be as much as approximately 100 percent thicker than without the abrasive blasting step. The hot dip galvanizing may be carried out according to American Society of Testing and Materials (ASTM) Standard A123/A123M according to various embodiments. The zinc alloy coating may be subjected to a second abrasive blasting process at step 720. The second abrasive blasting process may be similar (or even the same) as the abrasive blasting process described above for step 710, although one skilled in the art will recognize that any process parameter may be varied to accommodate the requirements of any specific anchor rod 410. At step 725, the abrasively blasted galvanized anchor rod 410 may be treated with a mineral acid solution. Exemplary mineral acids comprise hydrochloric acid, nitric acid, phosphoric acid, sulfuric acid, boric acid, hydrofluoric acid, hydrobromic acid, perchloric acid, hydroiodic acid, and mixtures thereof. The mineral acid concentration in the solution may range from about 20 percent by weight to about 60 percent by weight, although other concentrations may be used depending on factors such as the desired surface treatment and type of subsequent coating. In various embodiments, the mineral acid solution may contain other additives such as, but not limited to, chromates and wetting agents. The mineral acid solution may be applied at ambient temperature to the anchor rod 410 by spraying, dipping, brushing, rolling, or any other application method known in the art. The treated anchor may then be allowed to dry. The mineral acid solution may provide a mild etch to the surface of the anchor rod 410 to promote adhesion of subsequently applied coatings, as well as protect the surface from moisture. After drying, the next step of the process should occur as soon as is reasonable, but generally within 96 hours after drying to prevent contamination of the treated surface.

At step 730, at least a portion of the treated anchor rod 410 may be coated with a polymeric coating. The polymeric coating may be applied by spraying, dipping, brushing, rolling, or any other application method known in the art. In some embodiments, only the portion of the anchor rod 410 that will be encased within the concrete block 405 may be coated with the polymeric coating. In additional embodiments, only a portion of the anchor rod 410 that is not encased in the concrete block 405 may be coated with the polymeric coating. In still further embodiments, the entire anchor rod 410 may be coated with the polymer coating. The polymer coating may be an elastomeric coating and may be thermoset or thermoplastic. Non-limiting exemplary polymeric coatings may comprise may comprise any polymer or elastomeric material, such as but not limited to, a saturated rubber such as ethylene propylene rubber, epichlorohydrin rubber, polyacrylic rubber, silicone rubber, fluorosilicone rubber, fluoroelastomer, perfluoroelastomers, polyether block amides, chlorosulfonated polyethylene, and ethylene-vinyl acetate. Further examples of the polymeric coating may comprise unsaturated rubbers such as natural polyisoprene, synthetic polyisoprene, polybutadiene, chloroprene rubber, butyl rubber, halogenated butyl rubber, styrene-butadiene rubber, nitrile rubber, and hydrogenated nitrile rubber. Still further examples of the polymeric coating may comprise thermoplastic elastomers, resilin, elastin, polysulfide rubber, and elastolefin. Additional examples of the polymeric coating may comprise polyurethanes, urethanes, polyureas, polyurea hybrids, polyvinyl chloride, acrylics, epoxies, silicones, pneolic resins, and nitrocellulose. One skilled in the art will readily recognize that any coating material capable of forming a water-tight seal on the anchor rod 410 is within the scope of the present disclosure. After coating, the polymeric coating may be allowed to cure at step 735.

The cured polymeric coating may have a smooth, shiny finish after curing. In order to promote increased levels of adhesion between the polymeric coating and the concrete of the concrete block 405, the polymeric coating may optionally be roughened using a third abrasive blasting process at step 740. The third abrasive blasting process may be less aggressive than the previously described abrasive blasting processes. The blasting media used for the third abrasive blasting process may comprise crushed nut shells, fruit kernels, corn starch, wheat starch, sodium bicarbonate, dry ice, plastic, and the like, as well as mixtures of these media. The third abrasive blasting process may be wet or dry. The particle size (e.g., grit size) of the blasting media may be of any size suitable to achieve the desired surface finish considering such factors as nozzle pressure of the blast equipment, flow rate of the blast media, type of polymeric coating, hardness of the polymeric coating, etc. In various embodiments, mechanical, hand, and chemical methods may be used to roughen the surface of the polymeric coating.

Figure 8:
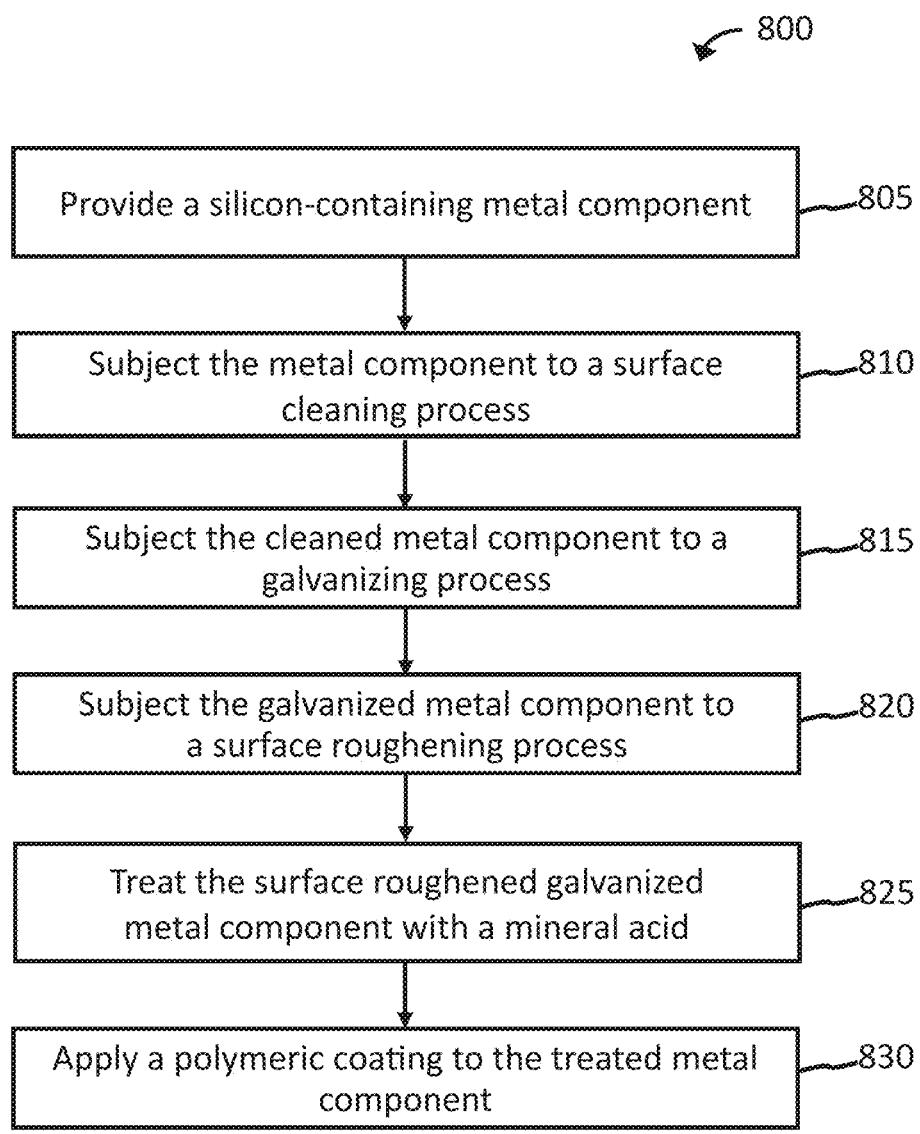
FIG. 8 is a flow diagram of an exemplary method for manufacturing a corrosion resistant metal component.

FIG. 8 is a flow diagram of an exemplary method 800 for manufacturing a corrosion resistant metal component, such as anchor rod 410. At step 805, a silicon-containing metal component may be provided. The silicon content of the metal component may be as described previously for FIG. 7. The metal component may be subjected to a surface cleaning process at step 810, which may comprise an abrasive blasting process in various embodiments or any other surface cleaning process known in the art. The cleaned metal component may be subjected to a galvanizing process at step 815, such as but not limited to a hot dip galvanizing process. The galvanized metal component may be subjected to a surface roughening process at step 820, which may comprise an abrasive blasting process or any other process known in the art to provide a roughened surface topography. The surface roughed galvanized metal component may be treated at step 825 with a mineral acid as described previously. At step 830, a polymeric coating may be applied to the treated metal component.

Figure 9:
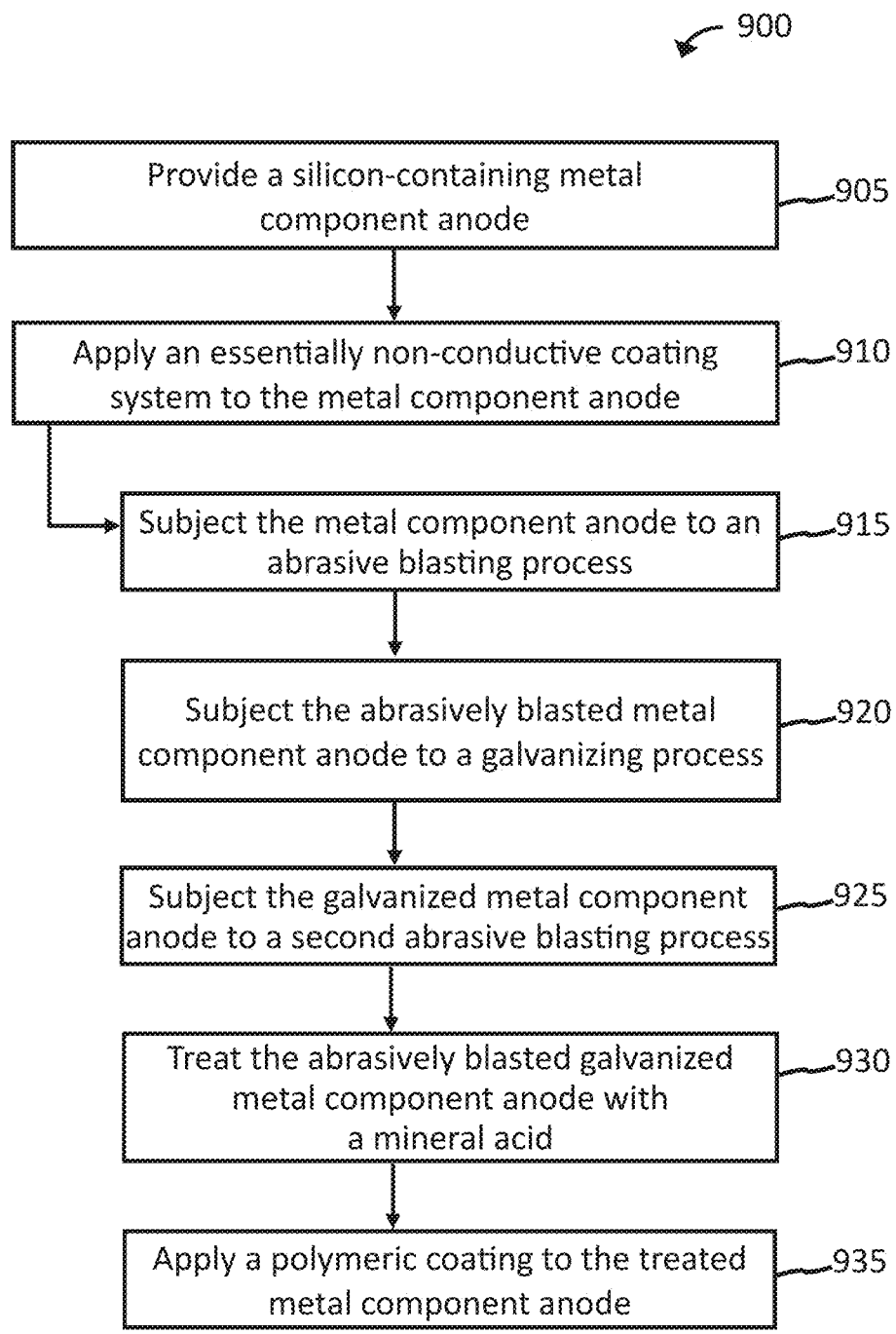
FIG. 9 is a flow diagram of an exemplary method for the prevention of forming a galvanic corrosion cell.

FIG. 9 is a flow diagram of an exemplary method for the prevention of forming a galvanic corrosion cell. At step 905, a silicon-containing metal component anode may be provided. In various embodiments, the metal component anode may be an anchor rod 410. An essentially non-conductive coating system may be applied to the metal component anode at step 910. Applying the coating system may comprise subjecting the metal component anode to an abrasive blasting process at step 915. At step 920, the abrasively blasted metal component anode may be subjected to a galvanizing process. In various embodiments, the galvanizing process may be a hot dip galvanizing process that applies a layer of zinc alloy to the metal component anode. The galvanized metal component anode may be subjected to a second abrasive blasting process at step 925. In various embodiments, the process parameters of the second abrasive blasting process may be the as, or may be different than, the process parameters of the first abrasive blasting process. At step 930, the abrasively blasted galvanized metal component anode may be treated with a mineral acid as described previously. A polymeric coating as described previously may be applied to the treated metal component anode at step 935. The coating system may be applied to the silicone-containing metal component anode such that essentially no electrical current flows between the metal component anode and a cathode when the metal component anode and the cathode are placed in a galvanic corrosion cell.

Figure 10:
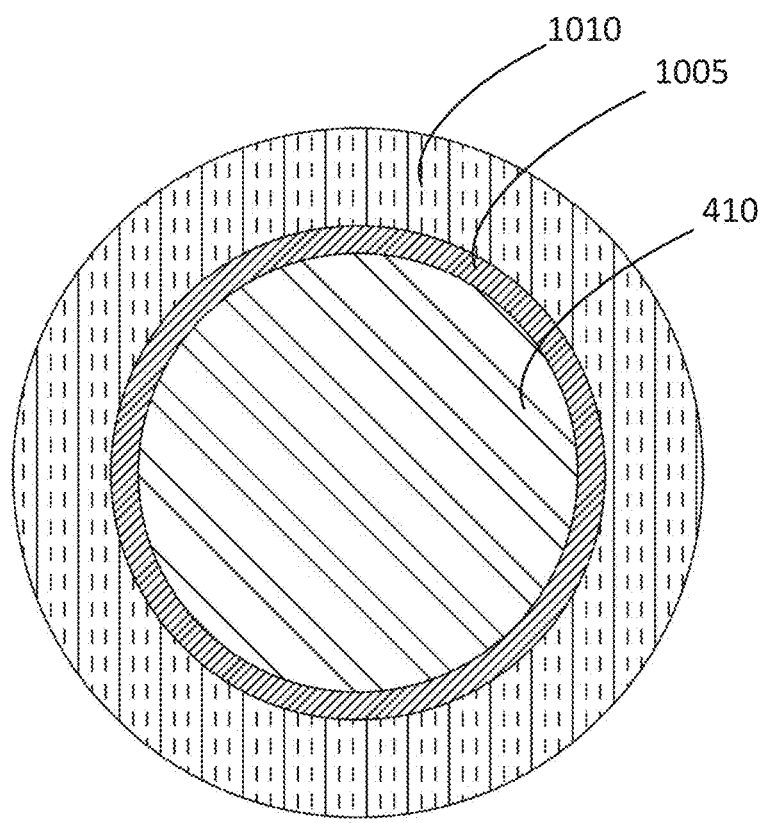
FIG. 10 is a cross-sectional view of a coated anchor rod.

FIG. 10 illustrates a cross-section of the anchor rod 410 after the process of FIG. 7 (not to scale) according to various embodiments. The anchor rod 410 may first be coated with the hot dip galvanized coating 1005 and then the polymeric coating 1010. The hot dip galvanized coating 1005 may have a thickness ranging from about 1 mil to about 10 mils (1 mil=0.001 inch). The polymeric coating 1010 thickness may be any desired thickness based on the needs of each specific application. For example, some embodiments may require about 30 mils (or less) for adequate corrosion protection. In other exemplary embodiments, a thickness of 120 mils (or more) may be required. Additionally, the thickness of the polymeric coating 1010 on the portion of the anchor rod 410 encased within the concrete block 405 may be different than the thickness elsewhere on the anchor rod 410. In other embodiments, the polymeric coating 1010 thickness may be essentially the same on all portions of the anchor rod 410.

Figure 11:
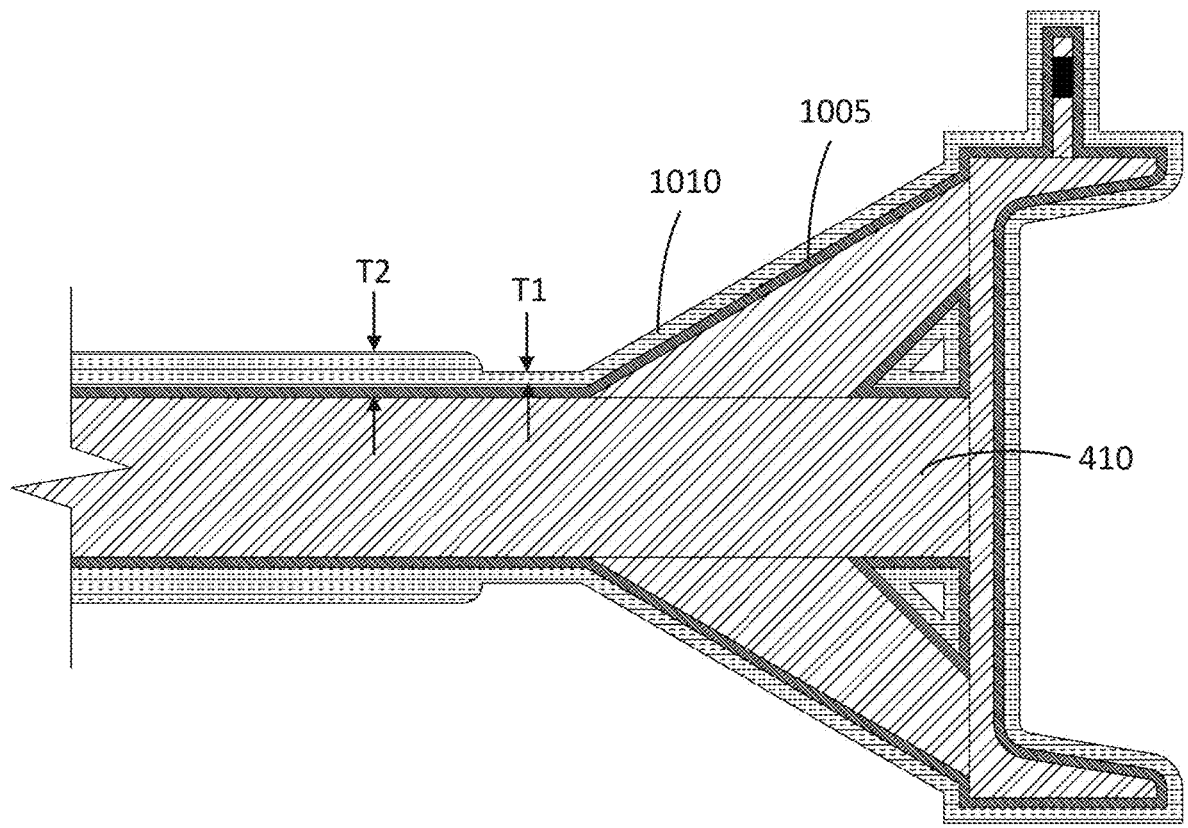
FIG. 11 is a longitudinal cross-sectional view of a coated anchor rod.

FIG. 11 illustrates a longitudinal cross-section of the anchor rod 410 according to various embodiments showing a thinner coating (represented by T1) of the polymeric coating 1010 on the portion of the anchor rod 410 encased within the concrete block 405, and a thicker coating (represented by T2) of the polymeric coating 1010 on another portion of the anchor rod 410.

Figure 12:
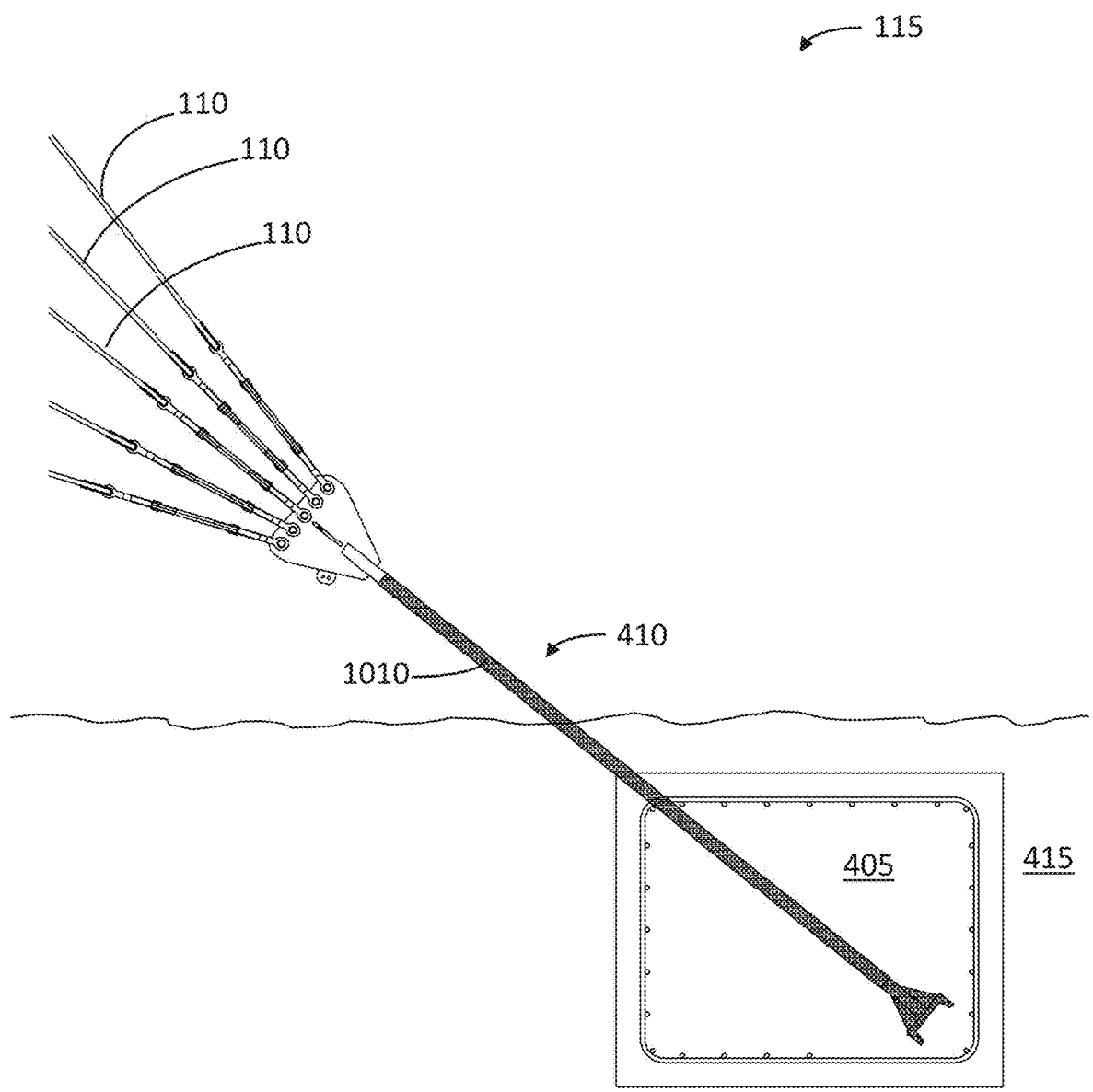
FIG. 12 is a cross-sectional view of an anchor point.

FIG. 12 illustrates various embodiments of an anchor point 115 in which the polymeric coating 1010 covers the portion of the anchor rod 410 encased within the concrete block 405, as well as the portion of the anchor rod 410 outside the concrete block 405 (including the portion of the anchor rod 410 in contact with the soil 415). In this embodiment, the anchor rod 410 may be protected from galvanic corrosion within the concrete block 405, as well as galvanic corrosion resulting from contact with the soil 415.

Figure 13:
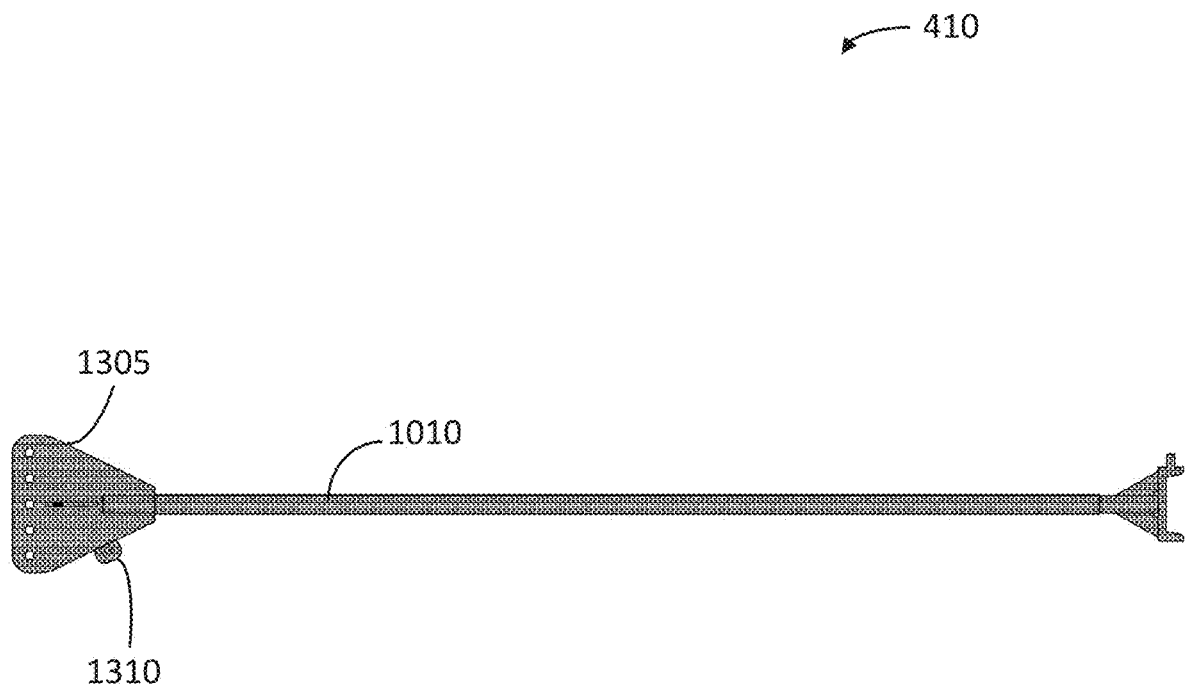
FIG. 13 is a side view of a coated anchor rod.

FIG. 13 illustrates a fan head 1305 coupled to an end of the anchor rod 410 to facilitate coupling of the guy wires 110 to the anchor rod 410. The fan head 1305 may further comprise a grounding lug tab 1310 to serve as a coupling point for the grounding wire 505 (see FIG. 5). In certain situations, the fan head 1305 and the grounding lug tab 1310 may be hot dip galvanized coated 1005, but not coated with the polymeric coating 1010 to assure an electrical connection between the guy wires 110 and the grounding wire 505. However, in other embodiments, the fan head 1305 and the grounding lug tab 1310 may also be coated with the polymeric coating 1010 as shown in FIG. 13.

It is believed that there is a synergistic effect of the silicon-containing metal component and the coating system as presented by method 700 of FIG. 7, method 800 of FIG. 8, and method 900 of FIG. 9. This synergistic effect may provide an enhanced and unexpected increase in the corrosion resistance properties of the silicon-containing metal component, such as the anchor rod 410, with the coating system than would be expected when considering the singular effect of each of the individual coatings (the singular effect of the hot dip galvanized coating 1005 and the singular effect of the polymeric coating 1010). Stated another way, if the corrosion protection of the hot dip galvanized coating 1005 by itself could be measured and given a value of 1, and the corrosion protection of the polymeric coating 1010 could be measured and given a value of 2, the surprising and unexpected synergistic effect of the combination of steps as presented by methods 700, 800, and 900 and described herein may provide a corrosion protection value greater than 3 (the sum of the individual corrosion protection values of the hot dip galvanized coating 1005 and the polymeric coating 1010). A recognized expert in the field of hot dip galvanizing and galvanic corrosion processes and methods of galvanic corrosion protection has reviewed the methods described above and has estimated that the synergistic effect is approximately 1.5 to 2.5 times the corrosion protection expected by simply combining a hot dip coating and a polymeric coating.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example

Methodology

Three guy wire anchors were treated by hot dip galvanizing to determine the effect on coating thickness of an enhanced corrosion protection method as compared to a standard process. Each guy wire anchor was constructed from silicon-containing steel, and comprised a foot section, a shaft section, and a fan head. The foot and shaft sections were subjected to the enhanced corrosion protection method, while the fan head was subjected to the standard corrosion protection method. The enhanced corrosion protection method comprised subjecting the foot and shaft sections to an abrasive blasting process prior to hot dip galvanizing. The fan head was not subjected to the abrasive blasting process (i.e., the standard corrosion protection method). The entire guy wire anchor (the foot section, the shaft section, and the fan head) was then hot dip galvanized in molten zinc metal. After allowing the guy wire anchors to cool to room temperature, the galvanized coating thickness was measured using a Type 2, DeFelsko 6000 FTS Probe SN 291327 instrument. The instrument was calibrated prior to use with DeFelsko Certified Shims SN 034578. Thickness readings were taken in five locations on the guy wire anchor: foot first side, foot opposite side, lower shaft, upper shaft, and fan head. The process was repeated for all three guy wire anchors.

Results

The following tables summarize the galvanized coating thickness measurements (in mils, or thousandths of an inch) for the three guy wire anchors.

Guy Wire Anchor #1

| Foot First Side | | | |
|---|---|---|---|
| | | | Average |
| Reading 1 | 8.00 | 7.50 | 8.00 | 7.83 |
| Reading 2 | 8.50 | 10.50 | 10.50 | 9.83 |
| Reading 3 | 8.00 | 8.00 | 8.00 | 8.00 |
| Combined Average: | | | 8.556 |

| Foot Opposite Side | | | |
|---|---|---|---|
| | | | Average |
| Reading 1 | 8.00 | 7.50 | 8.50 | 8.00 |
| Reading 2 | 10.00 | 8.50 | 10.00 | 9.50 |
| Reading 3 | 7.50 | 7.50 | 8.00 | 7.67 |
| Combined Average: | | | 8.389 |

| Lower Shaft | | | |
|---|---|---|---|
| | | | Average |
| Reading 1 | 8.50 | 9.50 | 10.00 | 9.33 |
| Reading 2 | 9.00 | 8.50 | 9.00 | 8.83 |
| Reading 3 | 9.00 | 9.00 | 9.50 | 9.17 |
| Combined Average: | | | 9.111 |

| Upper Shaft | | | |
|---|---|---|---|
| | | | Average |
| Reading 1 | 8.50 | 9.50 | 10.00 | 9.33 |
| Reading 2 | 13.50 | 9.50 | 9.00 | 10.67 |
| Reading 3 | 9.00 | 10.00 | 11.50 | 10.17 |
| Combined Average: | | | 10.056 |

| Fan Head | | | |
|---|---|---|---|
| | | | Average |
| Reading 1 | 4.50 | 5.00 | 5.00 | 4.83 |
| Reading 2 | 5.50 | 5.00 | 4.50 | 5.00 |
| Reading 3 | 5.00 | 4.50 | 4.50 | 4.67 |
| Combined Average: | | | 4.833 |

Guy Wire Anchor #2

| Foot First Side | | | |
|---|---|---|---|
| | | | Average |
| Reading 1 | 8.00 | 9.50 | 8.00 | 8.50 |
| Reading 2 | 12.00 | 11.00 | 9.00 | 10.67 |
| Reading 3 | 8.50 | 11.00 | 9.00 | 9.50 |
| Combined Average: | | | 9.556 |

| Foot Opposite Side | | | |
|---|---|---|---|
| | | | Average |
| Reading 1 | 8.00 | 8.50 | 8.50 | 8.33 |
| Reading 2 | 8.50 | 10.50 | 9.00 | 9.33 |
| Reading 3 | 8.00 | 8.50 | 8.50 | 8.33 |
| Combined Average: | | | 8.667 |

| Lower Shaft | | | |
|---|---|---|---|
| | | | Average |
| Reading 1 | 8.50 | 9.00 | 8.50 | 8.67 |
| Reading 2 | 10.00 | 12.00 | 12.00 | 11.33 |
| Reading 3 | 12.50 | 11.50 | 11.00 | 11.67 |
| Combined Average: | | | 10.556 |

| Upper Shaft | | | |
|---|---|---|---|
| | | | Average |
| Reading 1 | 12.00 | 11.50 | 10.50 | 11.33 |
| Reading 2 | 11.50 | 9.50 | 13.00 | 11.33 |
| Reading 3 | 9.00 | 9.00 | 9.50 | 9.17 |
| Combined Average: | | | 10.611 |

| Fan Head | | | |
|---|---|---|---|
| | | | Average |
| Reading 1 | 5.50 | 5.50 | 6.50 | 5.83 |
| Reading 2 | 4.50 | 6.00 | 4.50 | 5.00 |
| Reading 3 | 4.00 | 5.50 | 5.00 | 4.83 |
| Combined Average: | | | 5.222 |

Guy Wire Anchor #3

Foot First Side

|  |  |  |  | Average |
|---|---|---|---|---|
| Reading 1 | 9.50 | 8.50 | 8.50 | 8.83 |
| Reading 2 | 8.00 | 8.50 | 8.50 | 8.33 |
| Reading 3 | 8.00 | 8.00 | 8.00 | 8.00 |
|  |  | Combined Average: |  | 8.389 |

Foot Opposite Side

|  |  |  |  | Average |
|---|---|---|---|---|
| Reading 1 | 10.50 | 9.50 | 11.50 | 10.50 |
| Reading 2 | 9.00 | 7.50 | 7.50 | 8.00 |
| Reading 3 | 9.50 | 11.00 | 9.00 | 9.83 |
|  |  | Combined Average: |  | 9.444 |

Lower Shaft

|  |  |  |  | Average |
|---|---|---|---|---|
| Reading 1 | 8.00 | 8.00 | 7.50 | 7.83 |
| Reading 2 | 9.50 | 8.50 | 8.00 | 8.67 |
| Reading 3 | 7.50 | 7.50 | 6.50 | 7.17 |
|  |  | Combined Average: |  | 7.889 |

Upper Shaft

|  |  |  |  | Average |
|---|---|---|---|---|
| Reading 1 | 9.00 | 9.50 | 9.00 | 9.17 |
| Reading 2 | 10.50 | 12.50 | 90 . . . | 10.67 |
| Reading 3 | 8.50 | 9.50 | 11.50 | 9.83 |
|  |  | Combined Average: |  | 9.889 |

Fan Head

|  |  |  |  | Average |
|---|---|---|---|---|
| Reading 1 | 4.50 | 5.00 | 4.50 | 4.67 |
| Reading 2 | 5.00 | 4.00 | 4.50 | 4.50 |
| Reading 3 | 4.50 | 5.00 | 3.50 | 4.33 |
|  |  | Combined Average: |  | 4.500 |

CONCLUSIONS

For all three guy wire anchors, the enhanced corrosion protection method surprisingly and unexpectedly produced galvanized coating thickness that were consistently 1.92 times thicker than the coating thickness achieved by the standard process. The average galvanized coating thickness on the foot and shaft sections was 9.2 mils, while the average coating thickness on the fan head was 4.8 mils.

What is claimed is:

1. A method for prevention of forming a galvanic corrosion cell, comprising:
providing a silicon-containing metal component anode;
applying a non-conductive coating on the silicon-containing metal component anode, comprising the steps of:
subjecting the silicon-containing metal component anode to an abrasive blasting process;
subjecting the abrasively blasted silicon-containing metal component anode to a galvanizing process;
subjecting the galvanized silicon-containing metal component anode to a surface roughening process;
treating the surface roughened galvanized silicon-containing metal component anode with a mineral acid; and
applying a polymeric coating to the treated silicon-containing metal component anode to form a coated silicon-containing metal component anode; such that no electrical current flows between the coated silicon-containing metal component anode and a cathode when the coated silicon-containing metal component anode and the cathode are placed in the galvanic corrosion cell.

2. The method of claim 1, further comprising subjecting the polymeric coating to a process to roughen an outer surface of the polymeric coating.

3. The method of claim 1, wherein a silicon content of the metal component anode ranges from approximately 0.04 percent to approximately 0.4 percent.

4. The method of claim 1, wherein the galvanizing process is a hot dip galvanizing process.

5. The method of claim 1, wherein the galvanizing process applies a zinc alloy coating on the metal component anode.

6. The method of claim 1, wherein the mineral acid comprises hydrochloric acid, nitric acid, phosphoric acid, sulfuric acid, boric acid, hydrofluoric acid, hydrobromic acid, perchloric acid, hydroiodic acid, and mixtures thereof.

7. The method of claim 1, wherein the metal component anode comprises an anchor rod for a tower guy wire.

\* \* \* \* \*